July 14, 1953  G. H. BENDIX ET AL  2,645,117
LEAK DETECTOR FOR CANS AND THE LIKE
Filed Dec. 30, 1948

Inventors
Gordon H. Bendix
and Calvin R. Breden

By Mason, Porter, Miller & Stewart
Attorneys

Patented July 14, 1953

2,645,117

UNITED STATES PATENT OFFICE 2,645,117

LEAK DETECTOR FOR CANS AND THE LIKE

Gordon H. Bendix, Park Ridge, and Calvin R. Breden, La Grange, Ill., assignors to Continental Can Company, Inc., New York, N. Y., a corporation of New York Application December 30, 1948, Serial No. 68,225

5 Claims. (Cl. 73—40)

1

The specification which follows relates to leak detectors for cans and the like. The invention is an improvement on certain well known means for testing large numbers of cans for the preservation of foodstuffs and other products to assure that each can is gas-tight.

Means for this general purpose are represented by the patents granted September 3, 1935, Nos. 2,013,402 and 2,013,403 and November 12, 1935, No. 2,020,535, on the inventions of William Cameron. Typical of these means is the principle that each can of a series is successively subjected internally to air or other fluid under pressure. Any leakage through the walls or seams of the can is used to actuate an indicator and relay which in turn diverts the defective can from the normal discharge of those found to be satisfactorily air-tight. Certain limitations have been observed in the speed with which the successive cans may be tested and the minimum volume of gas leakage which must be present in order to actuate the means for subsequently separating the defective can.

This invention utilizes the well known principle that a flow of gas, as for example, leakage gas, over a heated resistor having a temperature coefficient can be employed to cause a Wheatstone bridge to go from a state of balance to a state of unbalance. In this way, the detecting mechanism is rendered more sensitive and responsive to a much smaller flow of leakage and the time required for observation is minimized. Further, the equipment is restored to a normal condition for subsequent tests with greater rapidity.

From the above it will be observed that it is an object to improve generally the detection of leakage by means of the flow of air currents resulting from the leak.

A further object of our invention is to increase the sensitivity of the test in a manner not attainable by the ordinary testing devices relying solely on pneumatic pressures. Thus small leaks not registered by the usual means can be readily detected.

Another object of the invention is to increase the speed with which the tests are made so that the machine shall have markedly greater capacity.

Among the objects of the invention is to provide means operating in such a manner that the detecting device is restored rapidly to normal condition, ready for successive use.

A still further object of the invention is that of providing facilities to accomplish the above results and yet adaptable to existing testing equipment without material reorganization.

For purposes of example, the invention has been illustrated in its preferred form on the accompanying drawing in which.

Figure 1:
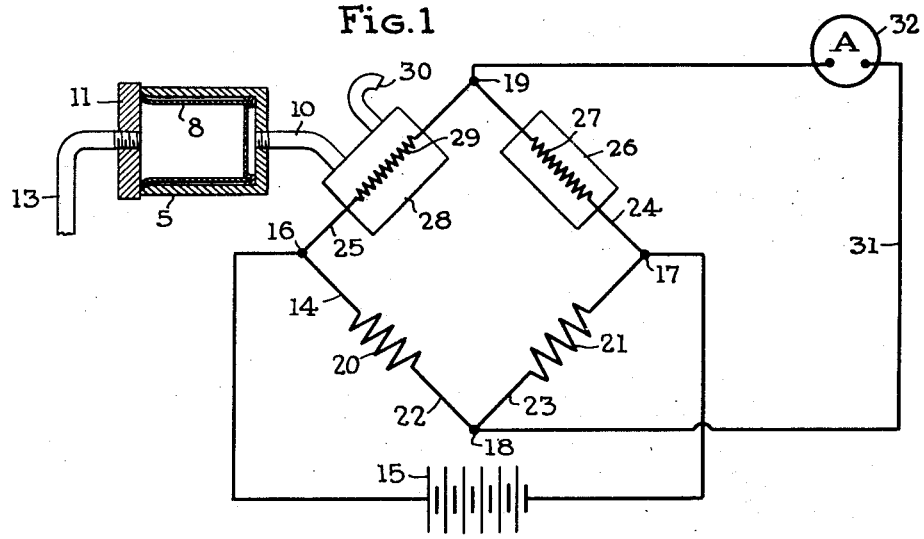
Fig. 1 is a schematic diagram showing the fundamental principle for detecting gas leakage according to the invention.
Figure 2:
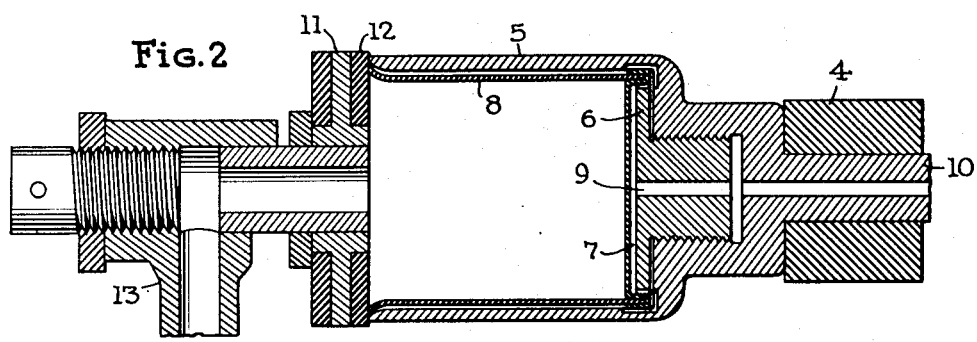
Fig. 2 is an enlarged longitudinal section of a can testing unit to which the invention has been applied.

Briefly described, the invention comprises the passage of air or other gas resulting from leakage from the can under test, to one of two heat-responsive resistors, each of which is a branch or arm of a Wheatstone bridge. This branch being traversed by the air will respond by changing resistance due to the cooling effect of the air. There results a change in the flow of current across the bridge which change is utilized for indicating leakage and actuating removal or separation of the defective can from the line of travel of the normal leakproof cans.

By way of example we have shown the invention associated with a testing machine, the general features of which are shown in the above Cameron patents.

In the drawings, 4 represents a web portion of the rotary wheel by which the successive cans are advanced for tests. This web carries a series of testing chambers 5 which conform to the shape of the cans being tested with an open end opposite the bottom plate 6. This bottom plate 6 is radially and peripherally grooved as at 7 to facilitate the passage of air leakage from the can 8 to an axial passageway 9. The passageway leads to a pipe 10.

A movable suction head 11 is provided opposite the open end of the testing chamber 5. The head carries a rubber pad 12 by which the open end of the chamber may be sealed.

A pipe 13 is carried by the suction head and serves to establish a condition of suction or air pressure at will.

Reference to the Cameron patent will explain in detail the manner in which the suction head is utilized, first to hold the can by means of its open, flanged end while it is being inserted in the chamber and fitted around the bottom plate 6. After the pad 12 seals the chamber, air pressure introduced through the pipe 13 to the degree desired will be used to test the can for leakage. Any leakage through the can or its seams will find its way through the grooves 7 of the bottom plate and escape through the pipe 10.

This pipe 10 leads to a Wheatstone bridge denoted generally by the numeral 14. A battery 15, or an equivalent source of either direct or alternating current is connected to the input terminals 16 and 17 of the bridge.

Output terminals 18 and 19 are provided for the bridge intermediate the terminals 16 and 17. The terminal 18 is connected between the input terminals 16 and 17 by equal or equalized resistances 20 and 21 in branches 22 and 23 respectively.

The opposite branches 24 and 25 are connected between the output terminal 19 and the terminals 16 and 17 respectively. These connections consist of the branch 24 between terminals 17 and 19 and the branch 25 between the terminals 16 and 19.

Branch 24 carries a block having a recess or open chamber 26. A resistance coil 27 passes through the recess 26 and forms part of the branch circuit 24. The recess forms a chamber approximately five-sixteenths of an inch in diameter and one-half inch long. Some variation in the dimensions is possible to increase the sensitivity of the bridge.

The coil 27 is made of thin platinum wire having a diameter of .001 and a length of 4 inches wound as a coil with an inside diameter .009 inch. The turns of the coil are slightly separated. At room temperature, this coil has an electrical resistance of about 20 ohms.

The opposite branch circuit 25 has a block having a recess or chamber 28. This recess contains a similar coil 29 with like electrical characteristics. When a potential difference of 5 volts is maintained between terminals 16 and 17, current is caused to flow, and heat to be generated in coils 27 and 29, resulting in an increase in the resistance of coils 27 and 29, so that their combined resistance is approximately 71.5 ohms.

The two filaments or coils attain a temperature of 225° C. at equilibrium temperature and this has been found preferable to provide for a satisfactory drop in temperature due to a flow of air past the coil 29. The temperature coefficient for platinum is such that the coil is sensitive to the passage of a slight quantity of air. With the temperature of coil 29 at approximately 225° C. a flow of air equivalent to 3.5 milliliters per minute results in the appearance of a voltage between terminals 18 and 19, which is sufficient to activate a conventional voltage detector of either the A. C. or D. C. type.

The wire in coil 29 is subjected to the flow of air from the pipe 10 flowing through the narrow recess 28. This jet is then vented from the recess 28 to the atmosphere through 30.

In Fig. 1, the output terminals 18 and 19 are connected by a circuit 31 through an ammeter 32. This ammeter registers the unbalanced flow of current caused by the cooling of the coil 29 and thus indirectly establishes the fact that there is leakage through the can 8.

It has been found that with the device above described a flow of air as small as 3.5 cc. per minute is clearly registered.

Figure 3:
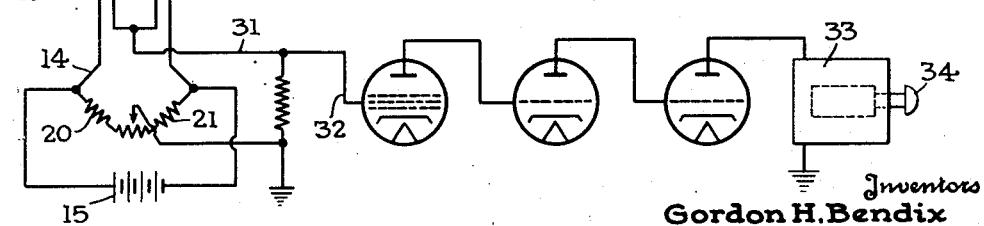
Fig. 3 is a schematic diagram of the leak detecting means connected to the unit illustrated in Fig. 2.

The flow of current in the circuit 31 is utilized for separating the leaky can from its normal course of travel. This has been illustrated diagrammatically in Fig. 3. Here the pipe 10 discharges into the recess 28 and against the coil 29 before venting.

This establishes a lack of balance with the corresponding coil in recess 26.

In the practical embodiment of the invention recesses 27 and 29 are mounted in separate cavities in a single block of metal so that they may respond equally to changes in atmospheric temperature and thereby prevent bridge unbalance.

Current resulting from the drop in temperature of coil 29 flows through circuit 31 and is fed into an amplifying circuit 32 of the usual electronic type. The output from circuit 32 leads to a relay 33. In this a solenoid operates an armature or throw-out plunger 34 by which the leaky can is disposed of in the usual known manner, for example as shown in Cameron Patent No. 2,013,402.

Other temperature-sensitive devices may be used in place of the hot-wire resistance. In some instances they may have much higher resistances (of the order of several thousand ohms) and in some instances, they may have a negative rather than a positive temperature coefficient. One such device, for example, thermistors, manufactured by the Western Electric Company may have a negative temperature coefficient of 4%. Its use will simplify the amplification required to actuate the throw-out plunger.

Change in the particular arrangement of the detector with relation to the can under test is also feasible. In the absence of a pressure chamber 5, the detector may be inserted in the air pressure supply line and used to measure the flow required to replace leakage from a can which has been held under pressure for a given time.

With the mechanism arranged as described above, the testing of empty cans for gas-tightness is greatly facilitated. The mechanism is applicable to existing types of testing machines. It is sensitive to gas leakage in a minimum quantity not usually detected or observable. Its response to leakage is immediate. After actuating the throw-out device, the mechanism is restored to normal as soon as pressure is relieved and is then ready to repeat its normal cycle.

The mechanism is capable of embodiment in various forms of equipment, differing from the above example but without departing from the scope of the invention as defined in the following claims.

What we claim is:

1. A device for detecting gas leakage from cans and the like comprising a receptacle for holding the can to be tested, a common closure for both the receptacle and the can, an inlet through the closure for air under pressure, means providing a discharge passageway from the receptacle, a pair of identical closed compartments, each having a resistance wire connected in parallel to an electric circuit, each of said compartments having an unrestricted vent to the atmosphere and one compartment being also connected with the discharge passageway, and means for indicating the differential current flow in the compartments caused by leakage through the discharge passageway and connected compartment.

2. A device for detecting gas leakage from cans and the like comprising a receptacle for holding the can to be tested, a common closure for both the receptacle and the can, an inlet through the closure for air under pressure, means providing a discharge passageway from the receptacle, two similar closed compartments each having an unrestricted vent to the atmosphere and one compartment being also connected with the said discharge passageway, an electric circuit having two branches, each branch having one of a pair of identical heat-responsive resistances, one of said resistances being located in each compartment and an operating element responsive to differences in current flow through the resistances.

3. A device for detecting gas leakage from cans and the like comprising a receptacle for holding the can to be tested, a common closure for both the receptacle and the can, an inlet through the closure for air under pressure, means providing a discharge passageway from the receptacle, two similar closed compartments each having an unrestricted vent to the atmosphere and one compartment being also connected with the said discharge passageway, an electric circuit, a Wheatstone bridge in the circuit, a pair of balanced heat responsive resistances located in said bridge, one of said resistances being located in each of said compartments, and a throw-out element actuated by current from said bridge.

4. A device for detecting gas leakage from cans and the like comprising a receptacle for holding the can to be tested, a common closure for both the receptacle and the can, an inlet through the closure for air under pressure, means providing a discharge passageway from the receptacle, two similar closed compartments each having an unrestricted vent to the atmosphere and one compartment being also connected with the said discharge passageway, an electric circuit, a Wheatstone bridge in the circuit, a pair of balanced heat responsive resistances located in said bridge, one of said resistances being located in each of said compartments, a current amplifier operated by the current flowing in the bridge, a solenoid operated by the amplifier and a throw-out-plunger actuated by the solenoid for diverting the can from which leakage occurs.

5. A device for detecting gas leakage from cans and the like comprising a receptacle for holding the can to be tested, a common closure for both the receptacle and the can, an inlet through the closure for air under pressure, means providing a discharge passageway from the receptacle, a block having two identical compartments, each having a free vent to the atmosphere, one of said compartments being connected to said discharge passageway, an electric circuit, a Wheatstone bridge in said circuit, a pair of heat responsive resistances forming part of said bridge and being located one in each of said compartments, and a can-throw-out device operated by the circuit on occurrence of unbalance in the bridge.

GORDON H. BENDIX.
CALVIN R. BREDEN.

References Cited in the file of this patent

UNITED STATES PATENTS

| Number | Name | Date |
| --- | --- | --- |
| 1,861,542 | McDonald et al. | June 7, 1932 |
| 1,933,322 | Fagan | Oct. 31, 1933 |
| 1,944,637 | Emanueli | Jan. 23, 1934 |
| 2,020,535 | Cameron | Nov. 12, 1935 |
| 2,214,181 | Rylsky | Sept. 10, 1940 |
| 2,412,471 | Olson | Dec. 10, 1946 |
| 2,449,556 | Kirkley | Sept. 21, 1948 |

FOREIGN PATENTS

| Number | Country | Date |
| --- | --- | --- |
| 601,523 | Great Britain | May 7, 1948 |